United States Patent
Liang et al.

(10) Patent No.: US 10,621,147 B1
(45) Date of Patent: Apr. 14, 2020

(54) REPLICATING FILE SYSTEM OBJECTS IN DISTRIBUTED FILE SYSTEMS

(71) Applicant: Qumulo, Inc., Seattle, WA (US)

(72) Inventors: Junjie Liang, Seattle, WA (US); Neal Thomas Fachan, Seattle, WA (US); Kevin David Jamieson, North Vancouver (CA); Kevin Ross O'Neill, Seattle, WA (US); Michael Anthony Chmiel, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/226,587

(22) Filed: Dec. 19, 2018

(51) Int. Cl.
*G06F 16/178* (2019.01)
*G06F 16/11* (2019.01)
*G06F 16/17* (2019.01)
*G06F 16/182* (2019.01)

(52) U.S. Cl.
CPC .......... *G06F 16/178* (2019.01); *G06F 16/128* (2019.01); *G06F 16/1734* (2019.01); *G06F 16/182* (2019.01)

(58) Field of Classification Search
CPC ............... G06F 16/128; G06F 11/2056; G06F 11/2082; G06F 16/178; G06F 16/1787; G06F 16/27; G06F 16/1734; G06F 16/182
See application file for complete search history.

(56) References Cited

U.S. PATENT DOCUMENTS

| | | | |
|---|---|---|---|
| 6,049,809 A * | 4/2000 | Raman | H04L 67/1095 |
| 6,385,641 B1 | 5/2002 | Jiang et al. | |
| 6,772,735 B2 | 8/2004 | Thexton et al. | |
| 6,874,130 B1 * | 3/2005 | Baweja | G06F 16/10 |
| | | | 715/805 |
| 7,072,911 B1 * | 7/2006 | Doman | G06F 16/27 |
| | | | 707/615 |
| 8,108,429 B2 | 1/2012 | Sim-Tang et al. | |
| 8,448,170 B2 | 5/2013 | Wipfel et al. | |
| 8,463,825 B1 | 6/2013 | Harty et al. | |
| 8,612,488 B1 | 12/2013 | Subramanya et al. | |

(Continued)

OTHER PUBLICATIONS

Office Communication for U.S. Appl. No. 15/967,499 dated Jun. 27, 2018, pp. 1-15.

(Continued)

*Primary Examiner* — David T. Brooks
(74) *Attorney, Agent, or Firm* — John W. Branch; Lowe Graham Jones PLLC

(57) ABSTRACT

Embodiments are directed to a file system engine that provides a file system with parent objects associated with child objects. The file system engine provides a replication snapshot associated with an epoch of the file system such that each child object modified during the epoch and each associated parent object is associated with the replication snapshot. A root object of a portion of the file system included in the replication snapshot may be provided. A replication engine may traverse the portion of file system starting from the root object such that the parent objects that are not associated with the replication snapshot are omitted from the traversal. The replication engine may determine replication objects based on the traversal such that each replication object was modified during the epoch. Then the replication engine may execute a replication job that copies replication objects to a target file system.

30 Claims, 11 Drawing Sheets

(56) References Cited

U.S. PATENT DOCUMENTS

| | | | |
|---|---|---|---|
| 8,805,786 B1* | 8/2014 | Natanzon | G06F 11/2064 |
| | | | 707/639 |
| 8,838,887 B1 | 9/2014 | Burke et al. | |
| 8,838,931 B1 | 9/2014 | Marshak et al. | |
| 8,868,797 B1 | 10/2014 | Kirac et al. | |
| 8,972,694 B1 | 3/2015 | Dolan et al. | |
| 9,026,765 B1 | 5/2015 | Marshak et al. | |
| 9,047,017 B1 | 6/2015 | Dolan et al. | |
| 9,158,653 B2 | 10/2015 | Gold | |
| 9,171,145 B2 | 10/2015 | Dash et al. | |
| 9,501,487 B1* | 11/2016 | Yuan | G06F 16/128 |
| 9,785,377 B2 | 10/2017 | Shin et al. | |
| 2003/0182313 A1* | 9/2003 | Federwisch | G06F 11/2066 |
| 2005/0091663 A1 | 4/2005 | Bagsby | |
| 2008/0059541 A1* | 3/2008 | Fachan | G06F 16/174 |
| 2008/0228772 A1 | 9/2008 | Plamondon | |
| 2008/0256474 A1* | 10/2008 | Chakra | G06F 3/0481 |
| | | | 715/772 |
| 2008/0270928 A1* | 10/2008 | Chakra | G06F 3/0481 |
| | | | 715/772 |
| 2010/0179959 A1* | 7/2010 | Shoens | G06F 16/128 |
| | | | 707/758 |
| 2012/0204060 A1 | 8/2012 | Swift et al. | |
| 2013/0318194 A1 | 11/2013 | Timbs | |
| 2014/0006354 A1 | 1/2014 | Parkinson et al. | |
| 2014/0040199 A1* | 2/2014 | Golab | G06F 16/219 |
| | | | 707/634 |
| 2014/0101389 A1 | 4/2014 | Nellans | |
| 2014/0258609 A1 | 9/2014 | Cui et al. | |
| 2014/0280485 A1 | 9/2014 | A Hummaida et al. | |
| 2014/0281307 A1* | 9/2014 | Peterson | G06F 3/065 |
| | | | 711/162 |
| 2014/0344222 A1* | 11/2014 | Morris | G06F 16/1844 |
| | | | 707/634 |
| 2014/0373032 A1 | 12/2014 | Merry et al. | |
| 2015/0193347 A1 | 7/2015 | Kluesing et al. | |
| 2016/0034356 A1* | 2/2016 | Aron | G06F 16/2246 |
| | | | 707/649 |
| 2016/0335278 A1* | 11/2016 | Tabaaloute | G06F 16/184 |
| 2016/0357677 A1 | 12/2016 | Hooker et al. | |
| 2017/0163728 A1* | 6/2017 | Chawla | G06F 3/0619 |
| 2017/0206231 A1 | 7/2017 | Binder et al. | |
| 2017/0316321 A1 | 11/2017 | Whitney et al. | |
| 2018/0040029 A1 | 2/2018 | Zeng et al. | |
| 2018/0314423 A1 | 11/2018 | Gong et al. | |
| 2019/0095112 A1 | 3/2019 | Lingarajappa | |

OTHER PUBLICATIONS

Office Communication for U.S. Appl. No. 16/228,716 dated Jun. 24, 2019, pp. 1-28.
Office Communication for U.S. Appl. No. 16/231,354 dated Jul. 10, 2019, pp. 1-19.
Office Communication for U.S. Appl. No. 16/262,756 dated Aug. 5, 2019, pp. 1-48.
Office Communication for U.S. Appl. No. 16/228,716 dated Feb. 28, 2019, pp. 1-27.
Office Communication for U.S. Appl. No. 16/231,354 dated Mar. 25, 2019, pp. 1-19.
Office Communication for U.S. Appl. No. 16/262,756 dated Apr. 2, 2019, pp. 1-46.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.

* cited by examiner

US 10,621,147 B1

REPLICATING FILE SYSTEM OBJECTS IN DISTRIBUTED FILE SYSTEMS

TECHNICAL FIELD

The present invention relates generally to file systems, and more particularly, but not exclusively, to managing file system replication in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. Naïve backup strategies may cause significant storage or performance overhead. For example, in some cases, the size or distributed nature of a modern hyper-scale file systems may make it difficult to determine the objects that need to be replicated. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
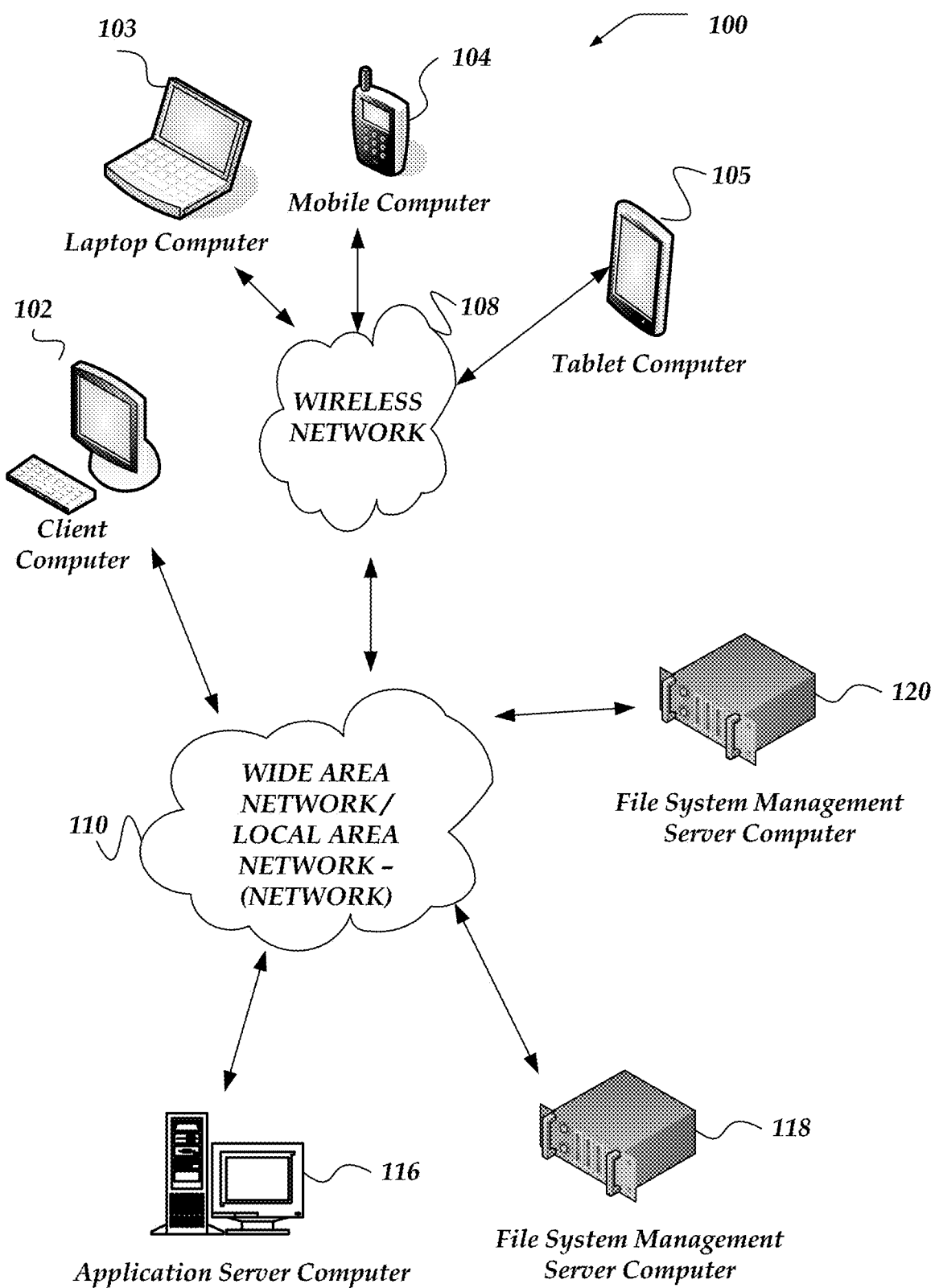
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object.

As used herein the terms "epoch," or "file system epoch" refer to time periods in the life of a file system. Epochs may be generated sequentially such that epoch 1 comes before epoch 2 in time. Prior epochs are bounded in the sense that they have defined a beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. Snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to number epochs and snapshots sequentially, the epoch value or its number label may be assumed to be greater than the number label of the newest snapshot. Epoch boundaries may be formed when a snapshot is taken. The epoch (e.g., epoch count value) is incremented if a snapshot is created. Each epoch boundary is created when a snapshot was created. In some case, if a new snapshot is created, it may be assigned a number label that has the same as the epoch it is closing and thus be one less than the new current epoch that begins running when the new snapshot is taken.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system engine may be instantiated to perform actions for managing data in a file system, as described below.

In one or more of the various embodiments, the file system engine may be arranged to provide a file system that includes a plurality of objects such that the plurality of objects includes one or more parent objects associated with one or more child objects.

In one or more of the various embodiments, the file system engine may be arranged to provide a replication snapshot that may be associated with an epoch of the file system such that each child object that may be modified during the epoch and each associated parent object is associated with the replication snapshot.

In one or more of the various embodiments, the file system engine may be arranged to provide a root object of a portion of the file system that may be included in the replication snapshot.

In one or more of the various embodiments, a replication engine may be instantiated to perform actions, including traversing the portion of file system starting from the root object such that the one or more parent objects that may be unassociated with the replication snapshot may be omitted from the traversal. And, in one or more of the various embodiments, the non-traversal of the one or more unassociated parent objects improves efficiency and performance of the network computer by reducing consumption of computing resources to perform the traversal.

In one or more of the various embodiments, the replication engine may be arranged to determine one or more replication objects based on the traversal such that each replication object may be associated with one or more modifications made during the epoch.

In one or more of the various embodiments, the replication engine may be arranged to execute a replication job that may copy the one or more replication objects to a portion of a target file system such that a hierarchy of the portion of the file system may be copied to the portion of the target file system.

In one or more of the various embodiments, the replication engine may be arranged to determine an amount of data associated with the replication job based on a sum of a size of each replication object. And, in one or more of the various embodiments, the replication engine may be arranged to provide an indicator that may be used to display one or more characteristics that are associated with a completion status of the replication job, wherein the one or more characteristics include one or more of a time remaining to complete the replication job, an amount of data provided to the target file system, a percentage of completion of the replication job, or the like.

In one or more of the various embodiments, the replication engine may be arranged to synchronize the file system and the target file system until a current epoch of the target file system matches a previous epoch of the file system that comes immediately before the epoch of the file system that is associated with the replication snapshot.

In one or more of the various embodiments, the replication engine may be arranged to determine one or more differences between the file system and the target file system based on the traversal such that each difference corresponds to a dissimilarity between the epoch associated with the one or more objects in the file system and a separate epoch associated with one or more other objects in the target file system.

In one or more of the various embodiments, the replication engine may be arranged to monitor one or more triggering conditions that may be associated with one or more of an application, a server, users, a file system object, or the like. And, in response to one or more of triggering conditions occurring, initiating one or more other replication jobs.

In one or more of the various embodiments, the replication engine may be arranged to provide status information that may be associated with the replication job based on the amount of data associated with the replication job such that the status information includes one or more of a replication job identifier, total size, completion status, transfer rate, amount of data remaining to be transferred, amount of data transferred, or the like. And, communicating the status information to one or more clients.

In one or more of the various embodiments, the replication engine may be arranged to discard the one or more modifications during the epoch associated with the replication snapshot. And, disassociate the one or more replication objects from the replication snapshot and removing the replication snapshot from the file system.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, file system management server computer 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118 or file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116, file system management server computer 118, file system management server computer 120, or the like, each as a single computer, the innovations or embodiments are not so limited. For example, one or more functions of application server computer 116, file system management server computer 118, file system management server computer 120, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, file system management server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
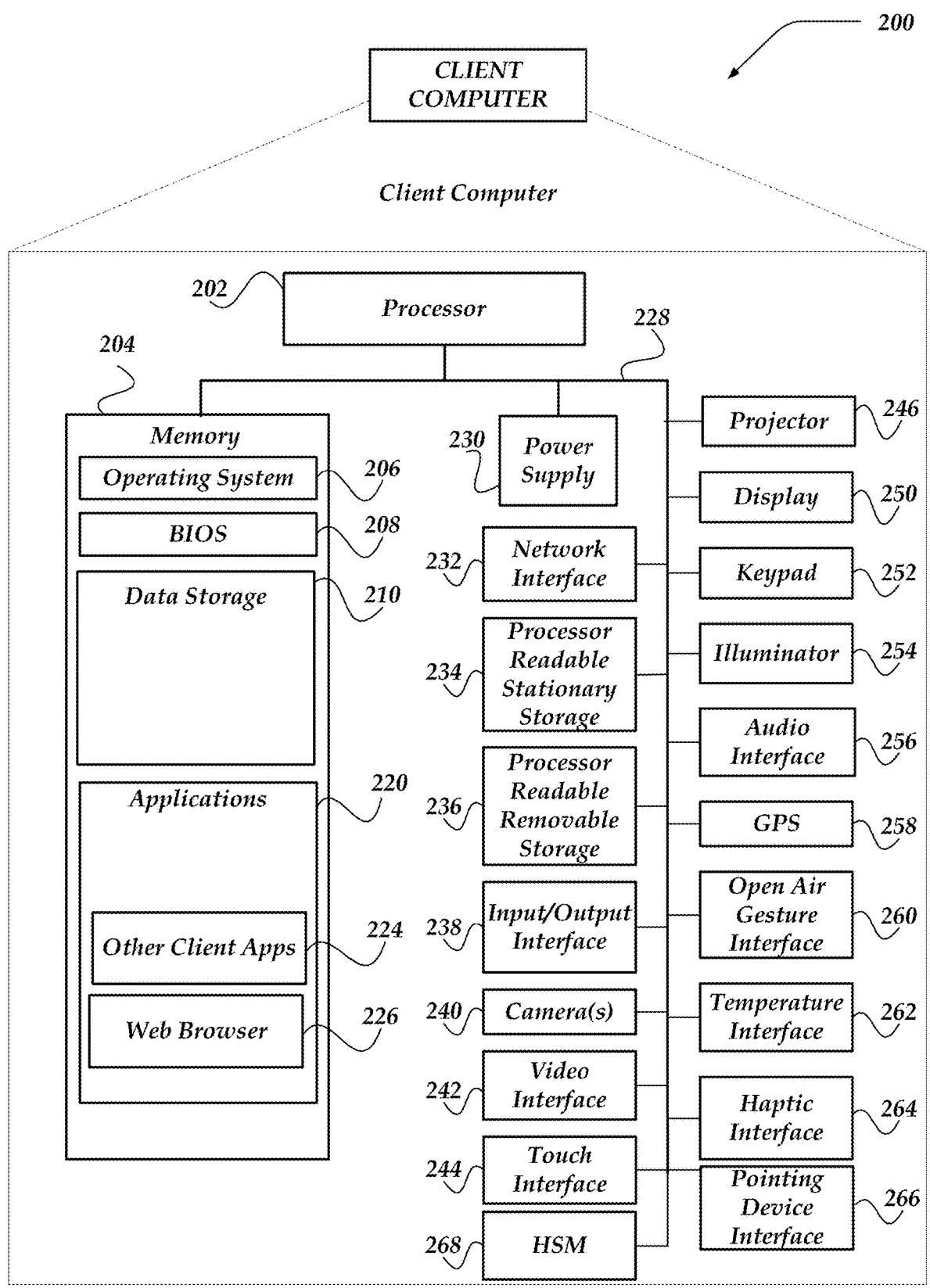
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
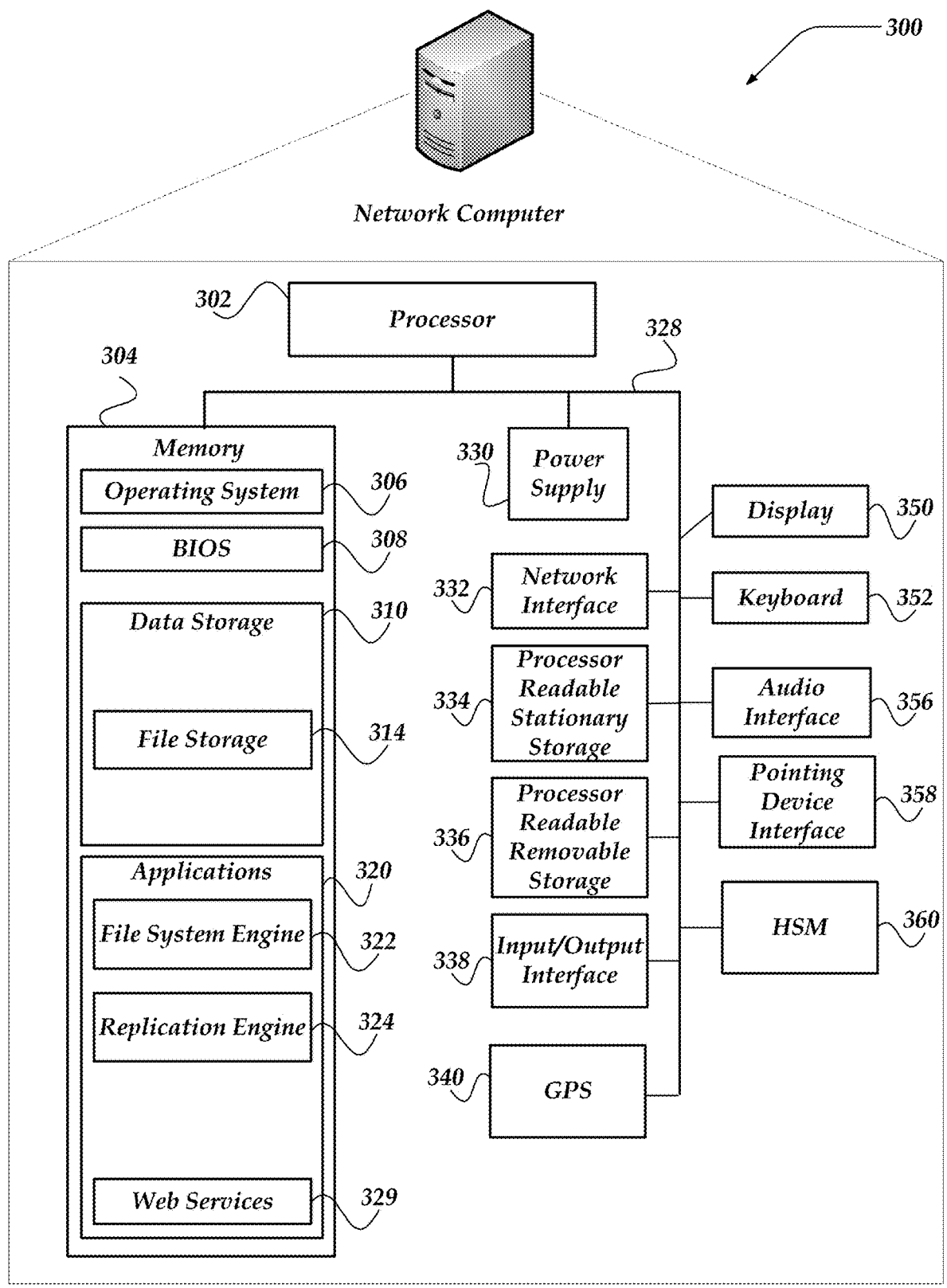
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, file system management server computer 118, or file system management server computer 120 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, replication engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, permissions information, file meta-data, data structures, or the like, that represent one or more portions of a distributed file system.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, replication engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, replication engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, replication engine 324, web services 329, or the like, may be provisioned and de-commissioned automatically.

Also, in one or more of the various embodiments, file system engine 322, replication engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
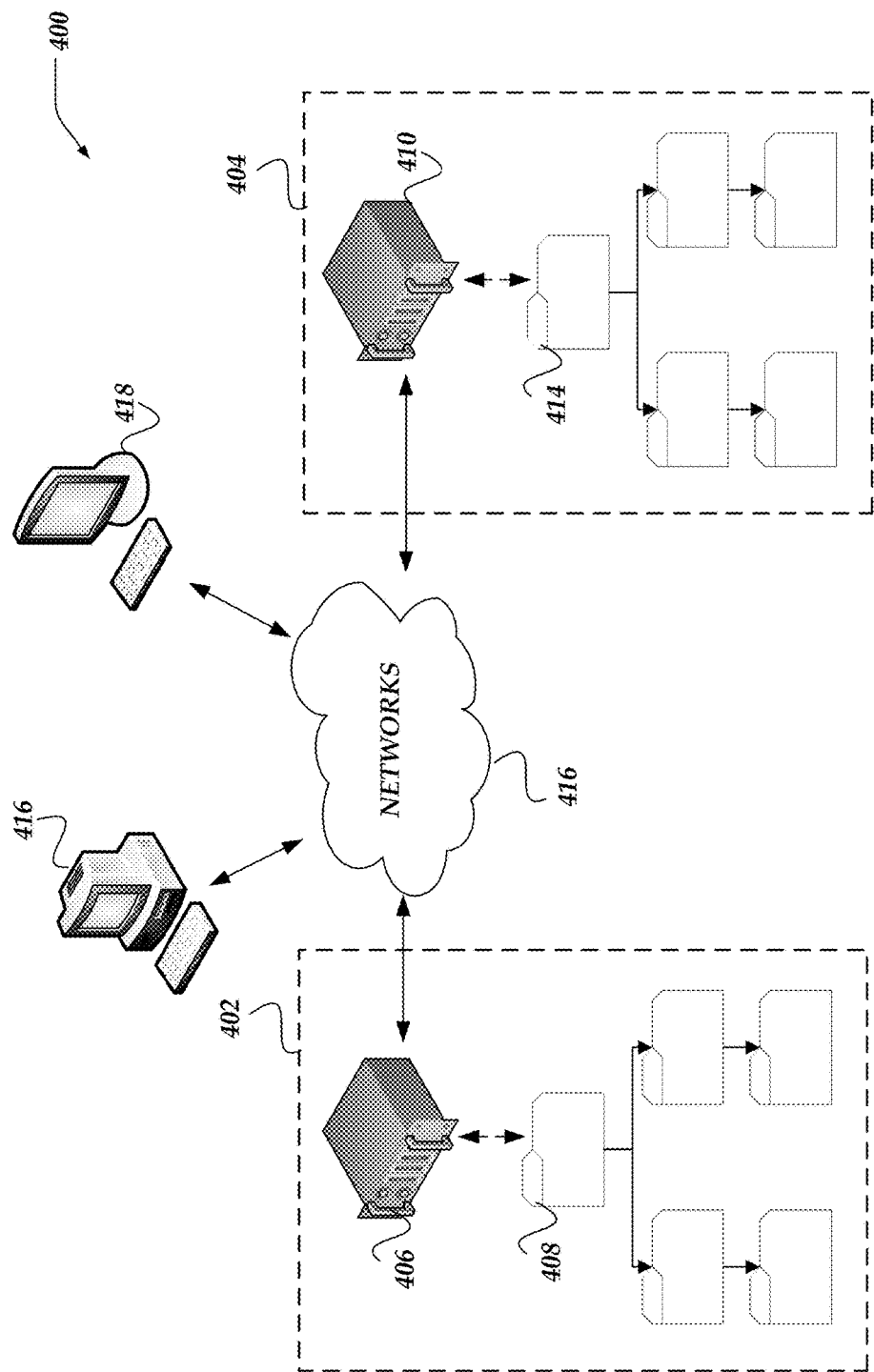
FIG. 4 illustrates a logical architecture of a system for replicating file objects in distributed file systems in accordance with one or more of the various embodiments.

FIG. 4 illustrates a logical architecture of system 400 for replicating file objects in distributed file systems in accordance with one or more of the various embodiments. In one or more of the various embodiments, two or more file systems, such as, file system 402 and file system 404 may be arranged to be communicatively coupled to one or more networks, such as, networks 416. Accordingly, in one or more of the various embodiments, one or more clients, such as, client computer 416 and client computer 418 may be arranged to access file system 402 or file system 404 over networks 416. In some embodiments, clients of file system 402 or file system 404 may include users, services, programs, computers, devices, or the like, that may be enabled to perform one or more file system operations, such as, creating, reading, updating, or deleting data (e.g., file system objects) that may be stored in file system 402 or file system 404. In some embodiments, file system 402 or file system 404 may comprise one or more file system management computers, such as file system management computer 406 or file system management computer 410. Also, in one or more of the various embodiments, file systems, such as file system 402 or file system 404 may include one or more file system objects, such as file system object 408 or file system object 414. file system object 412 or file system object 414 may represent the various objects or entities that may be stored in file system 402 or file system 404. In some embodiments, file system objects may include, files, documents, directories, folders, change records, backups, snapshots, replication information, versions, branches, or the like.

In one or more of the various embodiments, the implementation details that enable file system 402 or file system 404 to operate may be hidden from clients, such that they may be arranged to use file system 402 or file system 404 the same way they use other file systems, including local file systems. Accordingly, in one or more of the various embodiments, clients may be unaware that they are using a distributed file system that supports replicating file object to other file systems because file system engines or replication engines may be arranged to mimic the interface or behavior of one or more standard file systems.

Also, while file system 402 and file system 404 are illustrated as using one file system management computer each with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In one or more of the various embodiments, one or more clients may be configured to be administrators that may have roles that enable a varying degree of administrative powers to administer file system objects. In one or more of the various embodiments, administrators may be enabled to established the various rule-based policies that are enforced by one or more file system engines that may be running on the one or more file system management computers.

In some embodiments, one or more replications engines may be running on a file system management computer, such as, file system management computer 406 or file system management computer 410. In some embodiments, replication engines may be arranged to perform actions to replicate of one or more portions of one or more file systems.

In one or more of the various embodiments, the replication engine may be arranged to enable users to associate a source file system with the target file system. In one or more of the various embodiments, users may identify a portion of the source file system and a location in the target file system.

In one or more of the various embodiments, it may be desirable to configure file systems, such as, file system 402 to be replicate onto one or more different file systems, such as, file system 404. Accordingly, upon being triggered (e.g., via schedules, user input, continuous replication, or the like), a replication engine running on a source file system, such as, file system 402 may be arranged to replicate its file system objects on one or more target file systems, such as, file system 404. In some embodiments, replication engines may be arranged to replicate file system objects based on snapshot values or current update epochs associated with the file systems. As described below in more detail.

Figure 5:
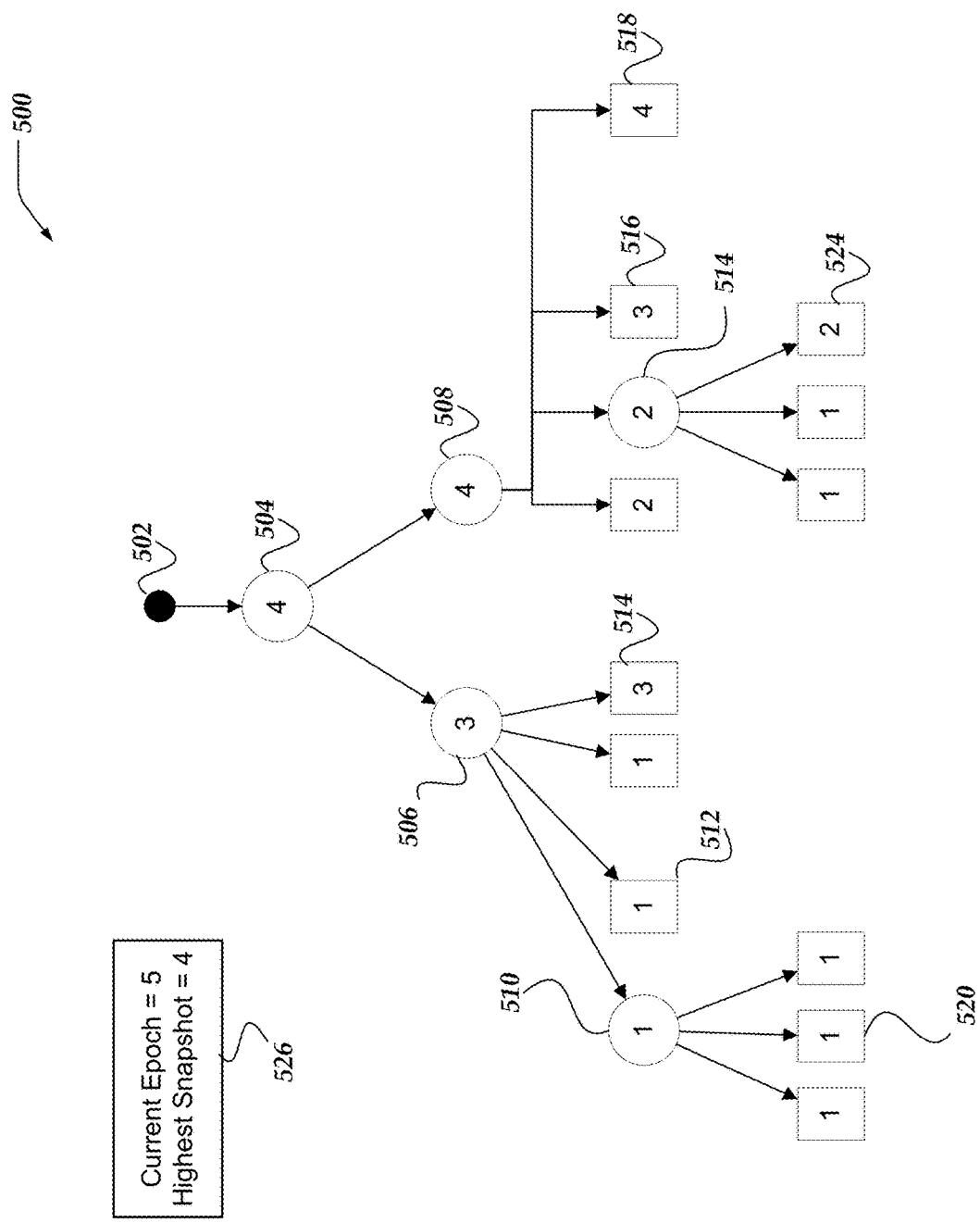
FIG. 5 illustrates a logical representation of a file system for replication file system objects in distributed file system in accordance with one or more of the various embodiments.

FIG. 5 illustrates a logical representation of file system 500 for replication file system objects in distributed file system in accordance with one or more of the various embodiments. In this example, for clarity and brevity file system 500 is represents as a tree, in practice, various data structures may be used to store the data that represents the tree-like structure of the file system. Data structures may include tabular formats that include keys, self-referencing fields, child-parent relationships, or the like, to implement trees for managing a file system, such as, file system 500.

In this example, circles are used to illustrate directory/folder file system objects. And, rectangles are used to represent other file system objects, such as, files, documents, blocks, or the like. The number in the center of the file system object represents the last/latest snapshot associated with the given file system object.

In this example, for some embodiments, root 502 is the beginning of a portion of a file system. Root 502 is not a file system object per se, rather, it indicates a position in a distributed file system. Directory 504 represents the parent file system object of all the objects under root 502. Directory 504 is the parent of directory 506 and directory 508. Directory 510, file object 512, and file object 514 are children of directory 506; directory 514, file object 516, and file object 518 are direct children of directory 508; file object 520 is a direct child of directory 510; and file object 524 is a direct child of directory 514. Also, in this example, for some embodiments, meta-data 526 includes the current update epoch and highest snapshot number for file system 500.

In this example, file system objects in file system 500 are associated with snapshots ranging from snapshot 1 to snapshot 4. The current epoch is number 5. Each time a snapshot is generated, the current epoch is ended and the new snapshot is associated with ending the current epoch. A new current epoch may be then be generated by incrementing the last current epoch number. Accordingly, in this example, if another snapshot is generated, it will have a snapshot number of 5 and the current epoch will become epoch 6.

In one or more of the various embodiments, if two or more file systems, such as, file system 500 are arranged for replication, one file system may be designated the source file system and one or more other file systems may be designated target file systems. In some embodiments, the portions of the two or more file systems have the same file system logical structure. In some embodiments, the file systems may have different physical or implementations or representations as long as they logically represent the same structure.

In one or more of the various embodiments, at steady-state, parent file system objects, such as, directory 504, directory 506, directory 508, directory 510, directory 514, or the like, have a snapshot number based on the most recent snapshot associated with any of its children. For example, in this example, directory 504 has a snapshot value of 4 because its descendant, file object 518 has a snapshot value of 4. Similarly, directory 508 has the same snapshot value as file object 518. Continuing with this example, this is because file object 518 was modified or created sometime after snapshot 3 was generated and before snapshot 4 was generated.

In one or more of the various embodiments, if file system objects are not modified subsequent to the generation follow-on snapshots, they remain associated with their current/last snapshot. For example, in this example, directory 514 is associated with snapshot 2 because for this example, it was modified or created after snapshot 1 was generated (during epoch 2) and has remained unmodified since then. Accordingly, by observation, a modification to file object 524 caused it to be associated with snapshot 2 which forced its parent, directory 514 to also be associated with snapshot 2. In other words, for some embodiments, if a file system object is modified in a current epoch, it will be associated with the next snapshot that closes or ends the current epoch.

Compare, for example, in some embodiments, how directory 510 is associated with snapshot 1 and all of its children are also associated with snapshot 1. This indicates that directory 510 and its children were created during epoch 1 before the first snapshot (snapshot 1) was generated and that they have remained unmodified subsequent to snapshot 1.

In one or more of the various embodiments, if file system 500 is being replicated, a replication engine, such as, replication engine 324, may be arranged to employ the snapshot or epoch information of the file system objects in a file system to determine which file system objects should be copied to one or more target file systems.

In one or more of the various embodiments, replication engines may be arranged to track the last snapshot associated with the last replication job for a file system. For example, in some embodiments, a replication engine may be arranged to trigger the generation of a new snapshot prior to starting a replication jobs. Also, in some embodiments, a replication engine may be arranged perform replication jobs based on existing snapshots. For example, in some embodiments, a replication engine may be configured to launch a replication jobs every other snapshot, with the rules for generating snapshots being independent from the replication engine. Generally, in one or more of the various embodiments, replication engines may be arranged to execute one or more rules that define whether the replication engine should trigger a new snapshot for each replication job or use existing snapshots. In some embodiments, such rules may be provided by configuration files, user-input, built-in defaults, or the like, or combination thereof.

In one or more of the various embodiments, file system engines, such as, file system engine 322 may be arranged to update parent object meta-data (e.g., current update epoch or snapshot number) before a write operation is committed or otherwise consider stable. For example, if file object 520 is updated, the file system engine may be arranged to examine the epoch/snapshot information for directory 510, directory 506, and directory 504 before committing the update to file object 520. Accordingly, in this example, if file object 520 is updated, directory 510, directory 506 and directory 508 may be associated the current epoch (5) before the write to file object 520 is committed (which will also associated file object 520 with epoch 5) since the update is occurring during the current epoch (epoch 5).

Figure 6:
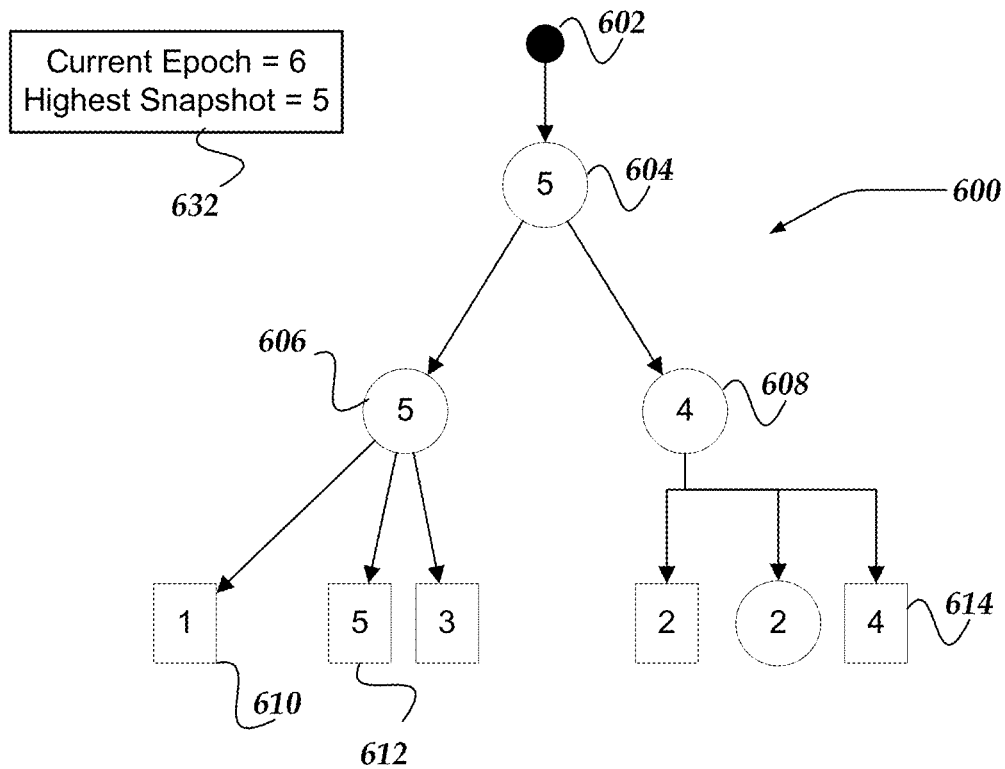
FIG. 6 illustrates a logical represent of two file systems arranged for replicating file system objects in distributed file systems in accordance with one or more of the various embodiments.
Figure 6:
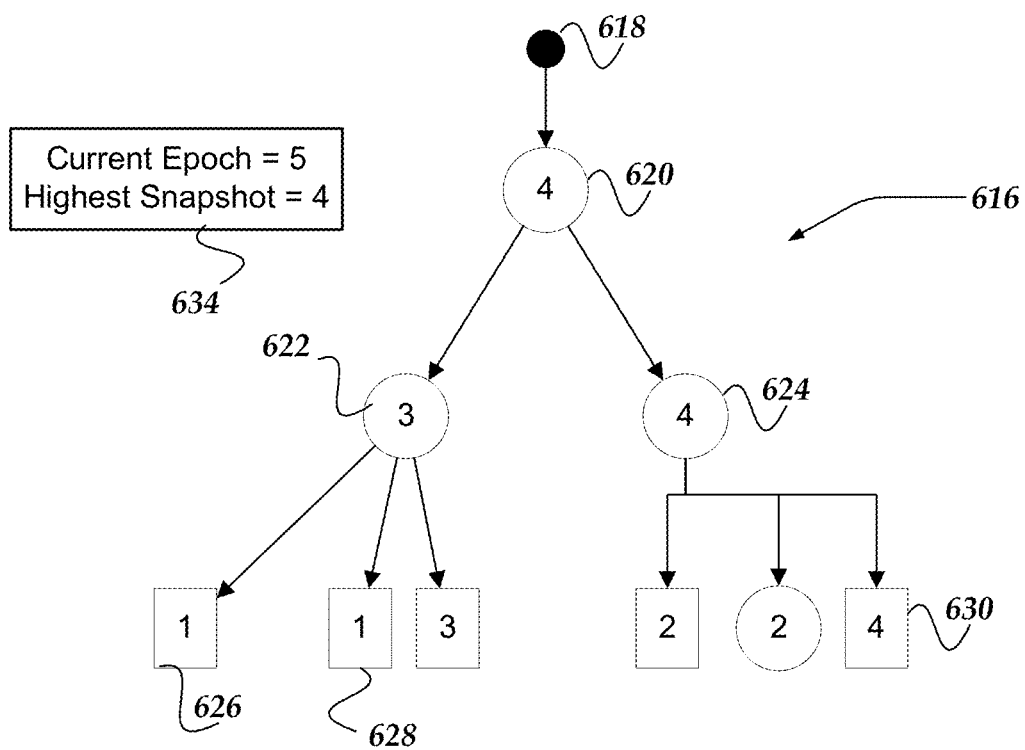

FIG. 6 illustrates a logical represent of two file systems arranged for replicating file system objects in distributed file systems in accordance with one or more of the various embodiments. In this example, file system 600 may be considered the source file system. In this example, file system 600 starts at root 602 and includes various file system objects, including, directory 604, directory 606, directory 608, file object 610, file object 612, file object 614, and so on. Likewise, for this example, file system 616 may be considered the target file system. In this example, file system 616 starts at root 618 and includes various file system objects, including, directory 620, directory 622, directory 624, file object 626, file object 628, file object 630, and so on.

Similar to FIG. 5, circles in FIG. 6 represent directory objects (file system objects that have children) and rectangles in FIG. 6 represent file system objects that are files, documents, blocks, or the like. The latest snapshot number for each file system object is indicated by the number in the center of each file system object. For example, directory object 606 is associated with snapshot number 5.

In one or more of the various embodiments, if a replication engine initiates a replication job, that job may be associated with a determined snapshot. In some embodiments, a replication engine may be arranged to trigger the generation of a snapshot before starting a replication job. In other embodiments, the replication engine may base a replication job on a snapshot that already exists. In this example, the replication engine may be arranged to initiate a replication job for the highest snapshot in file system 600, snapshot 5.

Accordingly, in one or more of the various embodiments, the replication engine may traverse file system 600 to identify file system objects that need to be copied to file system 616. In this example, as shown in the meta-data (meta-data 632) for file system 600, the current epoch for file system 600 is epoch 6 and the latest snapshot is snapshot 5. In some embodiments, the replication engine may be arranged to find the file system objects that have changed since the last replication job. In this example, meta-data 634 for file system 616 shows that the current epoch for file system 616 is epoch 5 and the latest snapshot for file system 616 is snapshot 4.

Note, in one or more of the various embodiments, the meta-data 632 or meta-data 634 may be stored such that they are accessible from either file system 600 or file system 616. Likewise, in some embodiments, one or more file systems may be provided meta-data information from another file system. In some embodiments, file systems may be arranged to communicate meta-data information, such as, meta-data 632 or meta-date 634 to another file system. In some embodiments, source file systems may be arranged to maintain a local copy of meta-data for the one or more target file systems. For example, in some embodiments, the source cluster may store the target cluster's Current Epoch/Highest Snapshot values.

In one or more of the various embodiments, file system 600 and file system 616 may be considered synced for replication. In some embodiments, configuring a replication target file system may include configuring the file system engine that manages the target file system to stay in-sync with the source file system. In some embodiments, staying in-sync may include configuring the target file system to be read-only except for replication activity. This enables snapshots on the target file system to mirror the snapshots on the source file system. For example, if independent writes were allowed on the target file system, the snapshots on the target file system may cover different file system objects than the same numbered snapshots on the source file system. This would break the replication process unless additional actions are taken to sync up the target file systems with the source file system.

In this example, a replication engine is configured to replicate file system 600 on file system 616. For this example, it can also be assumed that snapshot 5 of file system 600 is the latest snapshot that the replication engine is configured to replicate.

Accordingly, in this example, in one or more of the various embodiments, the replication engine may be arranged to determine the file system objects in file system 600 that need to be replicated on file system 616. So, in this case, where file system 616 has been synced to snapshot 4 of file system 600, the replication engine may be arranged to identify the file system objects on file system 600 that are associated with snapshot 5. The file system objects associated with snapshot 5 on file system 600 are the file system objects that need to be replicated on file system 616.

In one or more of the various embodiments, the replication engine may be arranged to compare the snapshot numbers associated with a file system object with the snapshot number of the snapshot that is being replicated to the target file system. Further, in one or more of the various embodiments, the replication engine may begin this comparison at the root of the source file system, root 602 in this example.

In one or more of the various embodiments, if the comparison discovers or identifies file system objects that have been modified since the previous replication job, those file system objects are the ones that need to be copied to the target file system. Such objects may be described as being in the replication snapshot. This means that that the file system object has changes that occurred during the lifetime of the snapshot the replication job is based on—the replication snapshot. If a directory object is determined to be in the replication snapshot, the replication engine may be arranged to descend into that object to identify the file system objects in that directory object that may need to be replicated. In contrast, if the replication engine encounters a directory object that is not in the replication snapshot, the replication engine does not have to descend into the that directory. This optimization leverages the guarantee that the snapshot value of a parent object is the same as the highest (or newest) snapshot that is associated with one or more of its children objects.

In one or more of the various embodiments, if the replication engine identifies file system objects in the source file system that may be eligible for replication, the contents of those file system objects may be copied to target file system. In one or more of the various embodiments, writing the data associated with the identified file system objects to the target file systems also includes updating the snapshot information and current epoch of the target file system.

In this example, file system 600 is being replication to file system 616. FIG. 6 shows how file system 616 appears before the replication has completed. At the completion of the replication job, file system 616 will appear the same as file system 600, including an update to meta-data 634 that will record the current epoch for file system 616 as epoch 6 and set the highest snapshot to snapshot 5.

In this example, the file system objects that a replication engine would identify for replication include directory 604, directory 606, and file object 612 as these are the only objects in file system 600 that are associated with snapshot 5 of file system 600. In one or more of the various embodiments, after these file system object are copied to file system 616, file system 616 will look the same as file system 600. Accordingly, in this example: directory 620 will be associated with snapshot 5 (for file system 616); directory 622 will be associated with snapshot 5; and file object 628 will be modified to include the content of file object 612 and will be associated with snapshot 5.

In one or more of the various embodiments, after the replication engine has written the changes associated with the replication job to the one or more target file systems, it may be arranged to trigger the generation of a snapshot to capture the changes made by the replication job.

In summary, in one or more of the various embodiments, a replication job may start with a snapshot, the replication snapshot, on the source file system. One or more file system objects on the source file system are determined based on the replication snapshot. The determined file system objects may then be copied and written to the target file system. After all the determined file system objects are written to the target file system, a snapshot is taken on the target file system to preserve the association of the written file system objects to target file system replication snapshot. Note, in one or more embodiments, there may be variations of the above. For example, a target file system may be configured close the target file systems current update epoch before a new replication job starts rather than doing at the completion of a replication job. For example, the target file system may be at current update epoch 4, when a new replication job starts, one of the replication engines first actions may be to trigger a snapshot on the target file system. In this example, that would generate snapshot 4 and set the current update epoch to epoch 5 on the target file system. Then in this example, the file system objects associated with the pending replication job will be modified on the target file system during epoch 5 of the target file system, which will result in them being associated with snapshot 5 when it is generated.

In one or more of the various embodiments, file system engines may also be arranged to employ snapshot numbers to discover differences between two similarly arranged file systems. File system engines may be arranged to rapidly compare two or more file systems by comparing snapshot numbers that are associated with the file system objects in each file system. For example, two paired/mirrored file systems that are intended to have the same layout and file system objects may be compared based on their current snapshot numbers or current epoch. In this example, if the current snapshot number of the first file system is 5 (with a current epoch is 6) and the current snapshot of the second file system is 4 with a current epoch of 5, the replication engine may determine the difference between the two file systems based on the snapshots associated with file system objects. In this example, for some embodiments, the replication engine may determine difference between the two file systems based on the file system objects in the first file system that are associated with snapshot 5. Accordingly, in this example, the second file system may be updated by executing a replication job associated with snapshot 5 of the first file system where the first file system is the source file system of the replication job and the second file system is the target file system of the replication job.

Similarly, in one or more of the various embodiments, snapshot values of paired or mirrored file systems may be employed to determine the file system objects that may have changes to rollback or discard if the replication engine is syncing a file system that has a current snapshot that is higher to a file system that has a lower snapshot. Continuing with the example described above, the file system objects on the first file system that are associated with snapshot 5 may be rolled back or discarded to bring first file system in sync to snapshot 4 of the second file system.

In one or more of the various embodiments, traversing the portion of file system starting from a designated root object and skipping the one or more parent objects that are unassociated with the replication snapshot improves efficiency and performance of the network computer or its one or more processors by reducing consumption of computing resources to perform the traversal. This increased performance and efficiency is realized because the replication engine or file system engine is not required to visit each object in the file store to determine if it has changed or otherwise is eligible for replication. Likewise, in some embodiments, increased performance and efficiency may be realized because the need for additional object level change tracking is eliminates. For example, an alternative conventional implementation may include maintaining a table of objects that have been changed since the last the replication job. However, for large file systems, the size of such a table may grow to consume a disadvantageous amount of memory.

Generalized Operations

FIGS. 7-11 represent generalized operations for replicating file system objects in distributed file systems in accordance with one or more of the various embodiments. In one or more of the various embodiments, processes 700, 800, 900, 1000, and 1100 described in conjunction with FIGS. 7-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may be used for replicating file system objects in distributed file systems in accordance with at least one of the various embodiments or architectures such as those described in conjunction with FIGS. 4-6. Further, in one or more of the various embodiments, some or all of the actions performed by processes 700, 800, 900, 1000, and 1100 may be executed in part by file system engine 322, or replication engine 324 running on one or more processors of one or more network computers.

Figure 7:
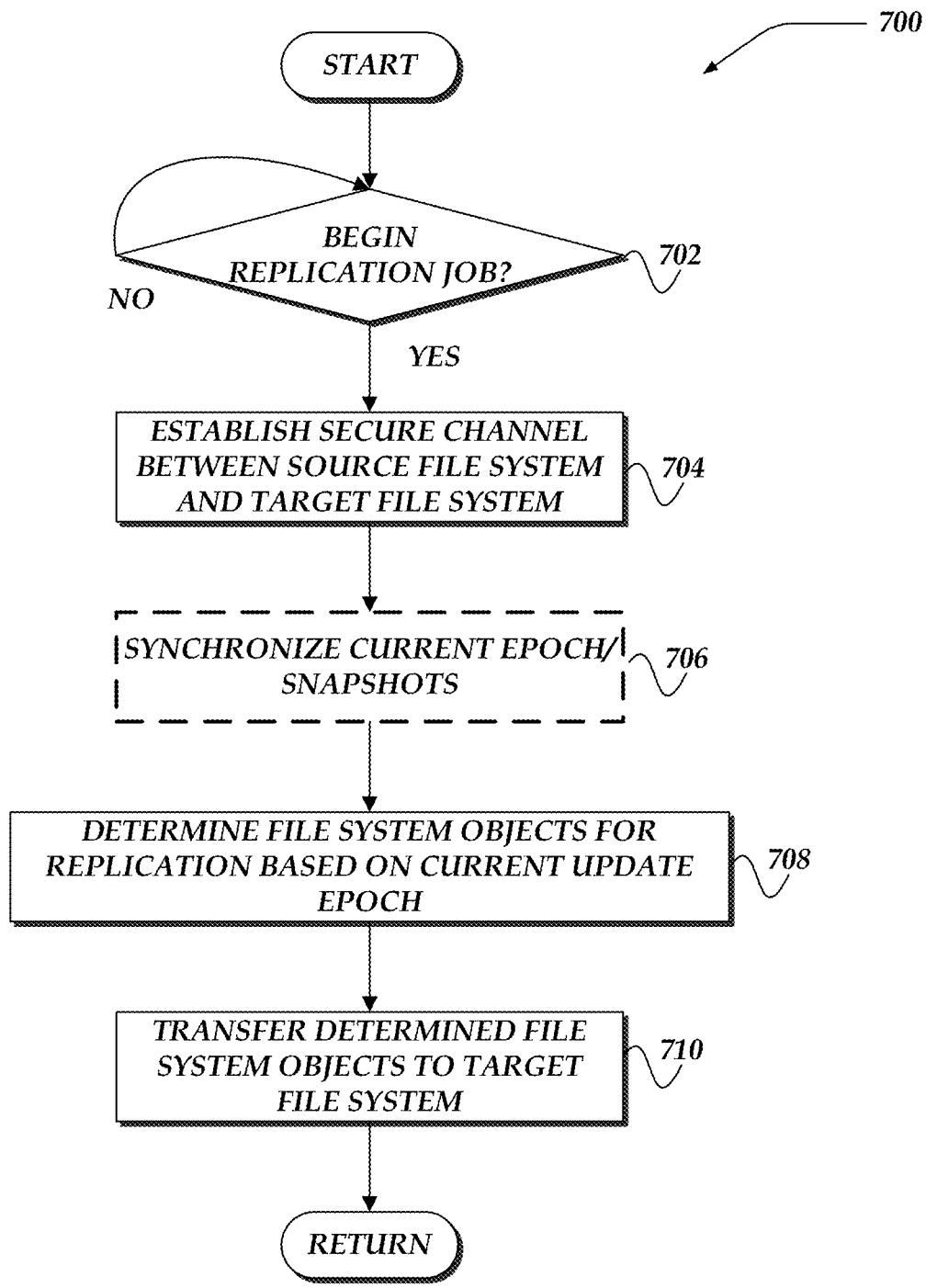
FIG. 7 illustrates an overview flowchart of a process for replicating file system objects in distributed file systems in accordance with one or more of the various embodiments.

FIG. 7 illustrates an overview flowchart of process 700 for replicating file system objects in distributed file systems in accordance with one or more of the various embodiments. After a start block, at decision block 702, in one or more of the various embodiments, if a replication job is started, a replication engine, such as, replication engine 324 may be instantiated to perform various, starting at block 704; otherwise, control may loop back to decision block 702.

At block 704, in one or more of the various embodiments, the replication engine or file system engine may establish or confirm a secure communication channel between a source file system and one or more target file systems. In some embodiments, a replication engine or a file system engine may be arranged to select or employ a secure channel that may be configured separately. For example, in some embodiments, replication engines may use one or more virtual private networks, secure tunnels, secure connections, or the like, that have been setup prior to the start of a replication job. In some embodiments, replication engines or file system engines may be arranged to establish a new secure connection for each replication job. In other embodiments, preexisting secure connections may be used.

In one or more of the various embodiments, secure connections may be established using conventional or customized methods. In some embodiments, the some or all of the credential information that is necessary for establish the secure communication channels may be stored in configuration information or provided via user input, and may include, SSL/TLS certificates, passwords, pass phrases, one or more cryptographic keys or key pairs, or the like, or combination thereof.

At block 706, in one or more of the various embodiments, optionally, the replication engine may interrogate the target file system to determine one or more characteristics that may be relevant to the pending replication job. In some embodiments, the replication engine may determine that one or more of the target file systems are not in-sync with the source file system or otherwise prepared for the replication job. For example, the target file system may be behind one or more snapshots/epochs relative to the source file system. Or, in some embodiments, the replication engine may discover that the target file system has been independently modified since the last replication job.

Accordingly, in one or more of the various embodiments, the replication engine may be arranged to generate one or more additional replication jobs or extend/expand the pending replication job to ensure that the target file system is synchronized with the source file system before running the pending replication job. In one or more of the various embodiments, this may include adding earlier source snapshots to the replication job; rolling back writes/modifications on the target file system; pushing changes in the target file system to the source file system before running the replication job, or the like, or combination thereof.

This block is indicated as being optional, because if the one or more target file systems are in-sync with the source file system, it may be omitted.

At block 708, in one or more of the various embodiments, the replication engine may be arranged to one or more file system objects for replication based on the current update epoch or a designated replication snapshot. As described above, and in more detail below, the replication engine may be arranged to scan the source file system to identify file system objects to include in the replication job. Generally, in one or more of the various embodiments, file system objects associated with the replication snapshot are file system objects that were modified during the epoch that was closed or ended by the replication snapshot.

At block 710, in one or more of the various embodiments, the replication engine may be arranged to communicate the one or more file system objects that are selected for replication from the source file system to the one or more target file systems. In one or more of the various embodiments, the replication engine may use the secure communication channel that was described for block 704. Next, control may be returned to a calling process.

Figure 8:
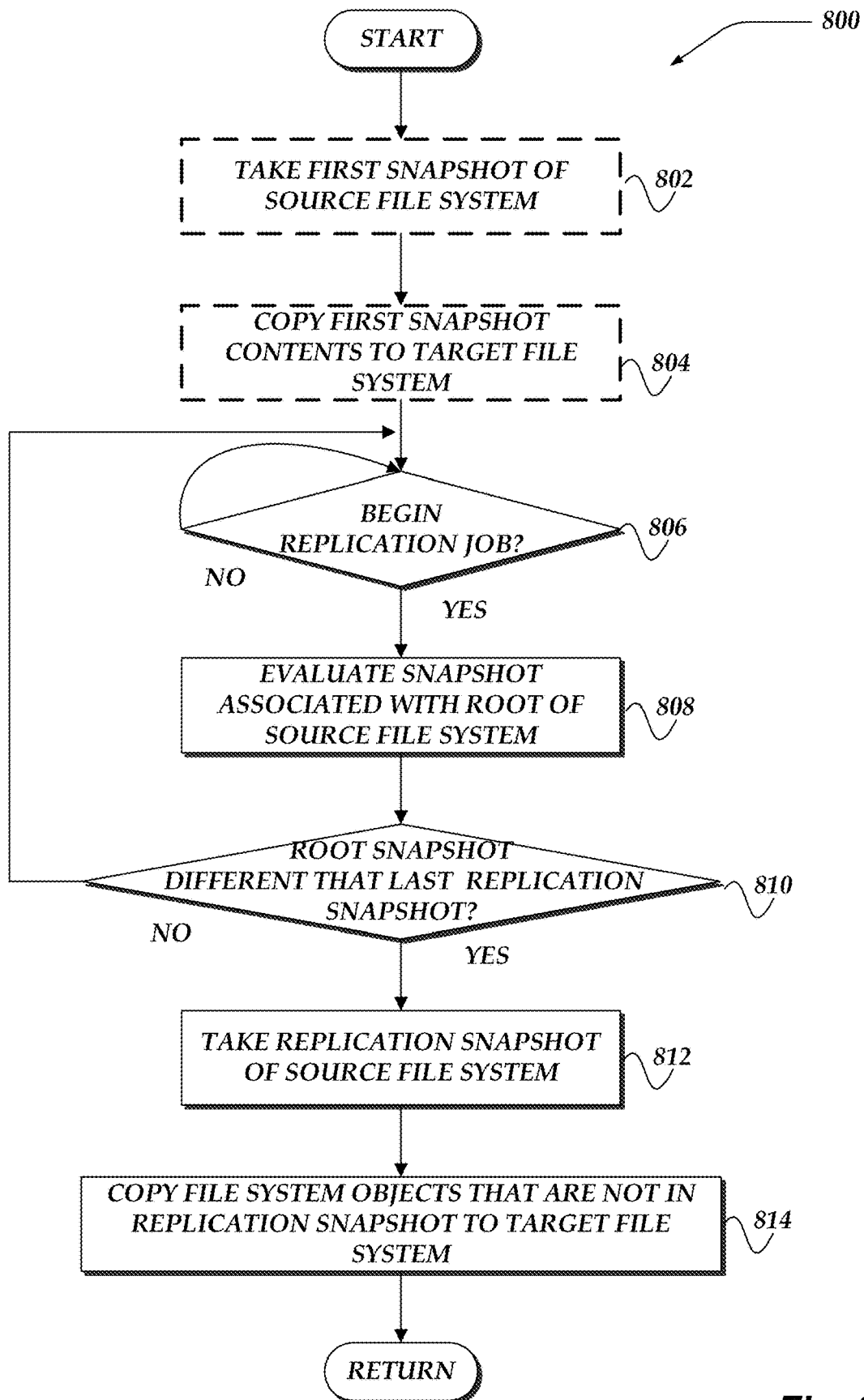
FIG. 8 illustrates a flowchart of a process for replicating file system objects in distributed file systems in accordance with one or more of the various embodiments.

FIG. 8 illustrates a flowchart of process 800 for replicating file system objects in distributed file systems in accordance with one or more of the various embodiments. In one or more of the various embodiments, replication engines may be instantiated to perform various actions to perform replication jobs. Process 800 describes one or more of the various actions for replicating file system objects in a distributed file system. After a start block, at block 802, in one or more of the various embodiments, optionally, the replication engine may generate a first snapshot for replication of the source file system. In some embodiments, if replication is being setup or performed for the first time, the replication engine may generate a first replication snapshot.

In some embodiments, this block may be optional because the source file system and the one or more target file systems may be in sync. For example, they may be brand new file systems that are setup with replication rules before users are allowed to store data in the source file system. In this case, a special first replication snapshot it not required, normal replication job snapshots (e.g., block 808) may suffice.

At block 804, in one or more of the various embodiments, optionally, if the source file system and one or more target file system are being setup as replication pairs, the one or more target file system might not be synced with the source file system. For example, one or more of the target file system may be new or otherwise empty file systems. Accordingly, for example, the replication engine may initialize the one or more target file systems with the file system objects on the source file system. In some cases, the entire contents of the source file system may be copied or otherwise regenerated onto the one or more target file system.

In some embodiments, this block may be optional because the source file system and the one or more target file systems may be in sync. For example, they may all be brand new file systems that are setup with replication rules before users are allowed to store data in the source file system.

At decision block 806, in one or more of the various embodiments, if a replication job is started, control may flow to block 808; otherwise, control may loop back to decision block 806. In one or more of the various embodiments, as discussed above replication engines may be arranged to employ policy rules, configuration information, user input, or the like, to determine if a replication job should be initiated. For example, in some embodiments, replication engines may be arranged to execute a replication job every hour (or other time periods). Likewise, in one or more of the various embodiments, replication engines may be arranged to execute replication jobs if one or more conditions are met, such as, time-of-day, number of modifications to the source file system, the occurrence of one or more events, actions performed by specific applications, or the like. In some embodiments, replication engines may be arranged to initiate replication jobs upon the occurrence of one or more triggering conditions or events that may be associated with one or more applications, servers, users, file system objects, or the like. For example, rules may be provided that execute a replication job each time a specific directory or file is modified or if one or more applications perform a particular action. For example, a replication engine may be configured to initiate a replication job each time a caching component writes stored values to persistent storage.

At block 808, in one or more of the various embodiments, the replication engine may be arranged to evaluate the snapshot associated with the root of the source file system to determine if the a replication snapshot should be generated. Accordingly, the replication engine may compare the snapshot number associated with the root file system object with the snapshot number associated with the last replication job. As discussed above, if the snapshot of the root object is the same as the last replication snapshot, it indicates that none of the file system objects below the root object have been modified at least since the last replication job was executed. Accordingly, the replication job may be considered completed before it does any more work. Note, in some embodiments, the root object may be considered a root of a portion of the source file system that is being replicated rather than being restricted to being the root of the entire source file system. Accordingly, in this context, the root object may be the root object of replication job.

At decision block 810, in one or more of the various embodiments, if the snapshot number associated with the root file system object is different than the snapshot number associated with the last replication snapshot, control may flow to block 812; otherwise, control may loop back to decision block 806 because the replication job is complete since there are no file system objects to replicate.

At block 812, in one or more of the various embodiments, the replication engine may generate a replication snapshot on the source file system. In some embodiments, the replication snapshot may be based on the entire source file system, or a portion of the source file system.

At block 814, in one or more of the various embodiments, the replication engine may be arranged to copy the one or more file system objects that are associated with replication snapshot from the source file system to the one or more target file systems. In one or more of the various embodiments, if the copying of file system objects associated with the replication job is complete, the replication engine may be arranged to trigger a snapshot to occur on the one or more target file systems. For example, if the replication snapshot is snapshot 5 on the source file system and the current update epoch on the target file system is epoch 5, the writes on the target file system that are associated with the replication job will occur in epoch 5 on the target file system. Upon completion of the replication job, the replication engine may trigger the file system engine to close epoch 5 by creating snapshot 5 to associate the modifications performed by the replication job with snapshot 5. Next, control may be returned to a calling process.

Figure 9:
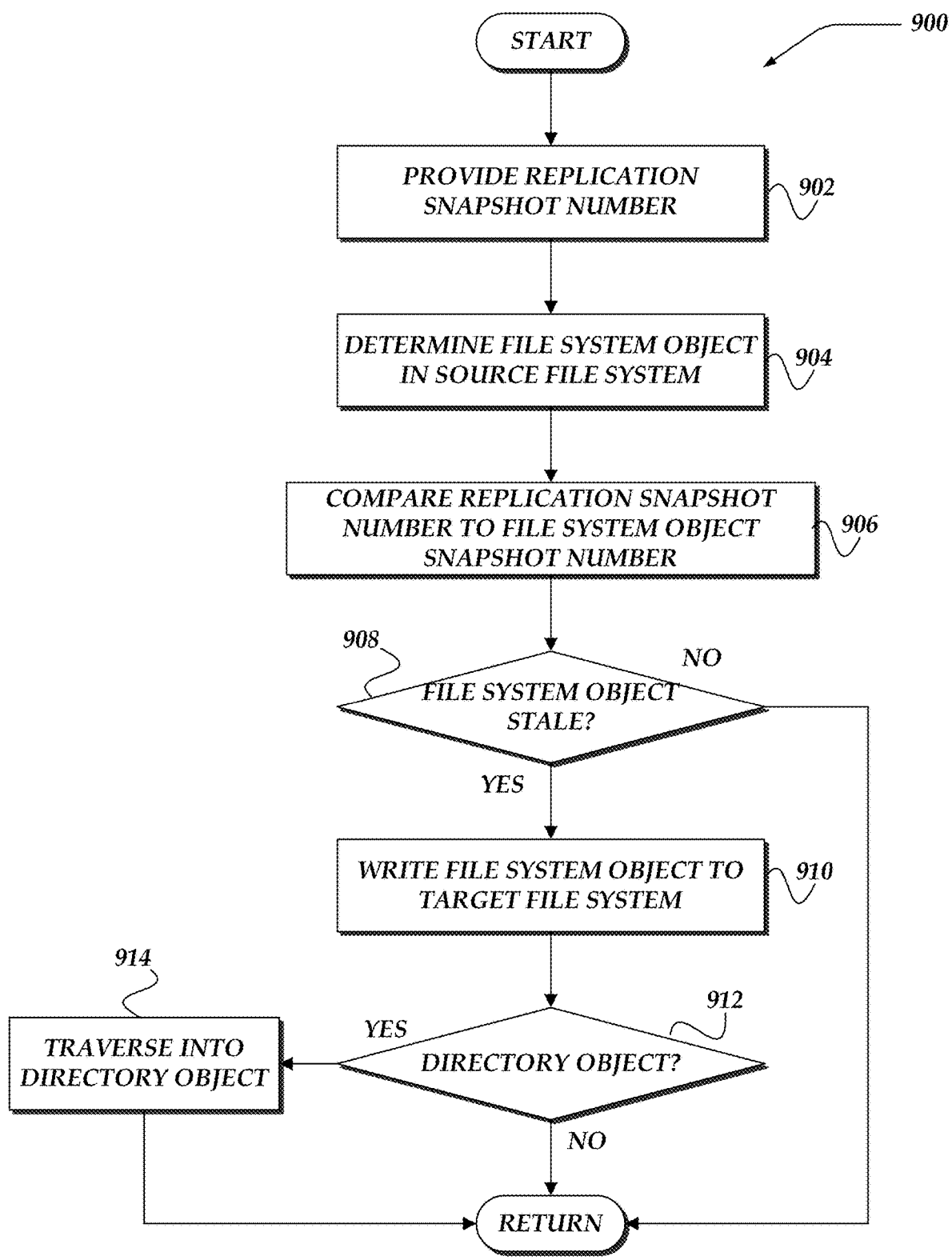
FIG. 9 illustrates a flowchart of a process for replicating a file system object in a distributed file system in accordance with one or more of the various embodiments.

FIG. 9 illustrates a flowchart of process 900 for replicating a file system object in a distributed file system in accordance with one or more of the various embodiments. After a start block, at block 902, in one or more of the various embodiments, a replication snapshot number may be provided to a replication engine. In some embodiments, the replication engine may generate or trigger the generation of the replication snapshot. For example, replication engines may be arranged to trigger a snapshot to be taken before it runs one or more replication jobs. In some embodiments, the replication engine may be provided a snapshot number corresponding to snapshot that is already available on the source file system.

At block 904, in one or more of the various embodiments, the replication engine may determine a file system object to examine for replication eligibility. In one or more of the various embodiments, one or more file system objects in the source file system may qualify for the pending replication job. In one or more of the various embodiments, the replication engine may scan the source file system to identify one or more file system objects that may be eligible for the replication job.

At block 906, in one or more of the various embodiments, the replication engine may be arranged to compare the replication snapshot number to the latest snapshot number that is associated with the one or more file system objects.

At decision block 908, in one or more of the various embodiments, if the file system object is stale, control may flow to block 910; otherwise, control may be returned to a calling process. For example, if the replication snapshot is snapshot X and the snapshot associated with the file system object is snapshot X, the file system object may be eligible for replication. In one or more of the various embodiments, the replication engine may be arranged to test if the file system object has been modified in the replication snapshot meaning it was modified during the epoch that corresponds to the replication snapshot.

At block 910, in one or more of the various embodiments, the file system object may be written to the one or more target file systems. In one or more of the various embodiments, if the file system object is a file object (e.g., documents, files, blocks, or the like) the meta-data and changed contents of the of the file system object may be copied to the one or more target file systems.

At decision block 912, in one or more of the various embodiments, if the file system object is a directory object (e.g., a file system object that is a parent of other file system objects), control may flow to block 914; otherwise, control may be returned to a calling process.

At block 914, in one or more of the various embodiments, because the file system object is a stale directory object, the replication engine may be arranged to descend into the file system object to check for child file system object that may be stale. Note, if the directory object is not stale, the replication engine may skip over the directory object rather than descend into it because it is guaranteed that the child objects will not be eligible for replication. For example, if a child file system object is eligible for replication, its parent object will be eligible as well. Next, control may be returned to a calling process.

Figure 10:
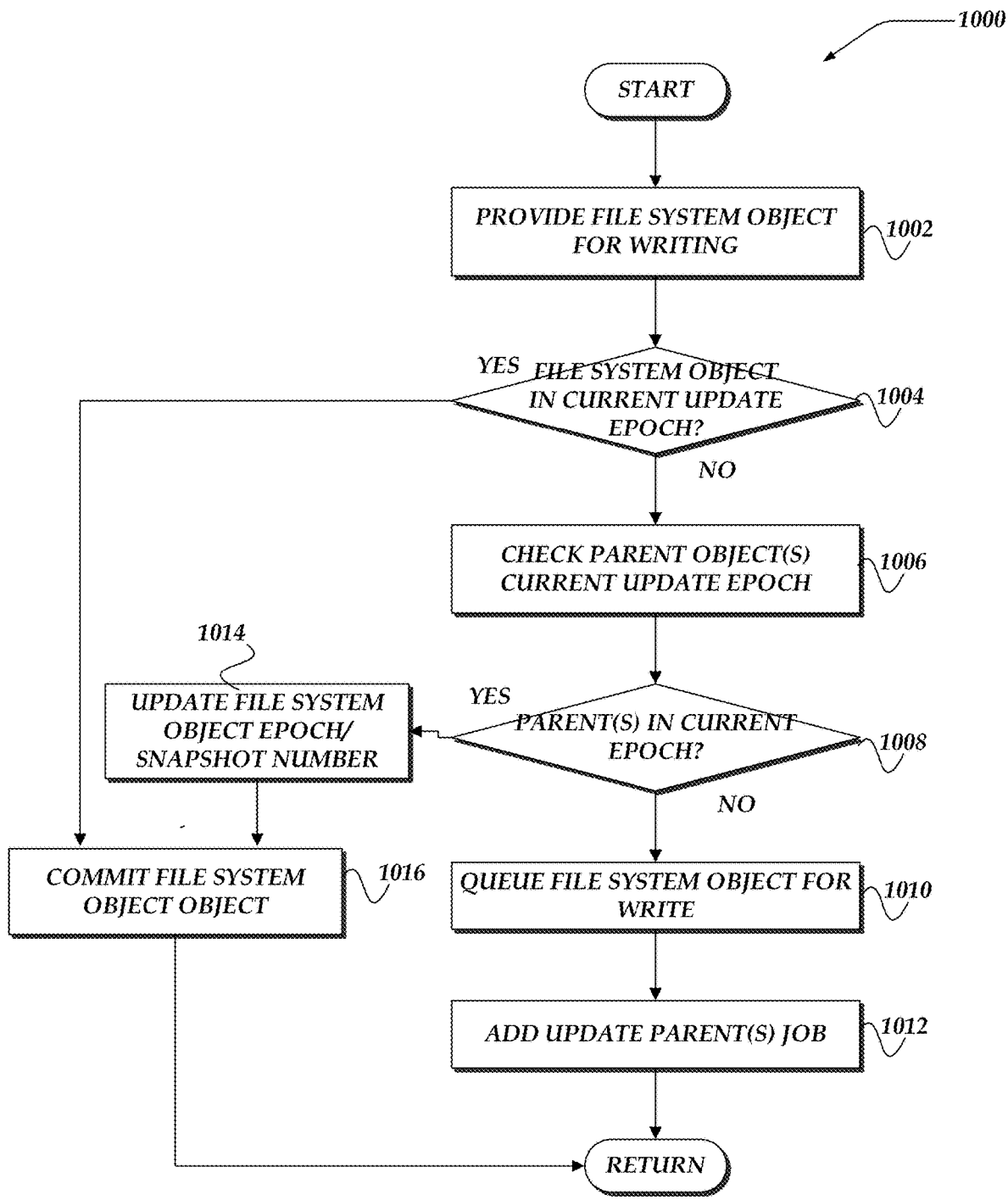
FIG. 10 illustrates a flowchart of a process for writing a file system object to a file system in a distributed file system in accordance with one or more of the various embodiments.

FIG. 10 illustrates a flowchart of process 1000 for writing a file system object to a file system in a distributed file system in accordance with one or more of the various embodiments. After a start block, at block 1002, in one or more of the various embodiments, a file system object may be provided to a file system engine for writing (e.g., creating, updating, deleting, or the like).

At decision block 1004, in one or more of the various embodiments, if the file system object is in the current update epoch of the file system, control may flow to block 1016; otherwise, control may flow to block 1006.

At block 1006, in one or more of the various embodiments, the file system engine may check the current update epoch or snapshot numbers for each parent of the file system object. If the immediate parent of the file system object is not in the current update epoch or in the latest snapshot (e.g., the replication snapshot) the file system engine will examine the parents object's parent (if any) to determine if it is current update epoch or latest snapshot. Accordingly, in some embodiments, the file system engine may be arranged to visit each parent object in ascending order. It may terminate its ascent upon discovering the first ancestor that is in the current update epoch or in the latest snapshot.

At decision block 1008, in one or more of the various embodiments, if the parents' of the file system object (if any) are in the current epoch of the file system, control may flow to block 1014; otherwise, control may flow to block 1010.

At block 1010, in one or more of the various embodiments, the file system engine may be arranged to queue the file system object write operation. In one or more of the various embodiments, file system engine may be arranged to perform one or more pre-commit operations before committing the write to stable/persistent storage. Accordingly, during the execution of the one or more pre-commit actions, the file system object write may be may be queued until the pre-commit tasks have been executed.

At block 1012, in one or more of the various embodiments, the file system engine may be arranged to add an update parent(s) job to a local work queue. In one or more of the various embodiments, one or more ancestors of the file system object may be updated to reflect that they or one or more of their children have been modified in the current update epoch or that they are associated with the latest snapshot. In some embodiments, if the parents are updated successfully, the file system object write may continue, In this example, process 1000 may dequeue the write operation for the file system object and pass control to block 1014. Next, control may be returned to a calling process.

At block 1014, in one or more of the various embodiments, the file system object meta-data may be updated to reflect that it has been updated in the current epoch or associated with the latest snapshot, such as, a replication snapshot. At block 1016, in one or more of the various embodiments, the file system object write may be committed to stable storage. Next, control may be returned to a calling process.

Figure 11:
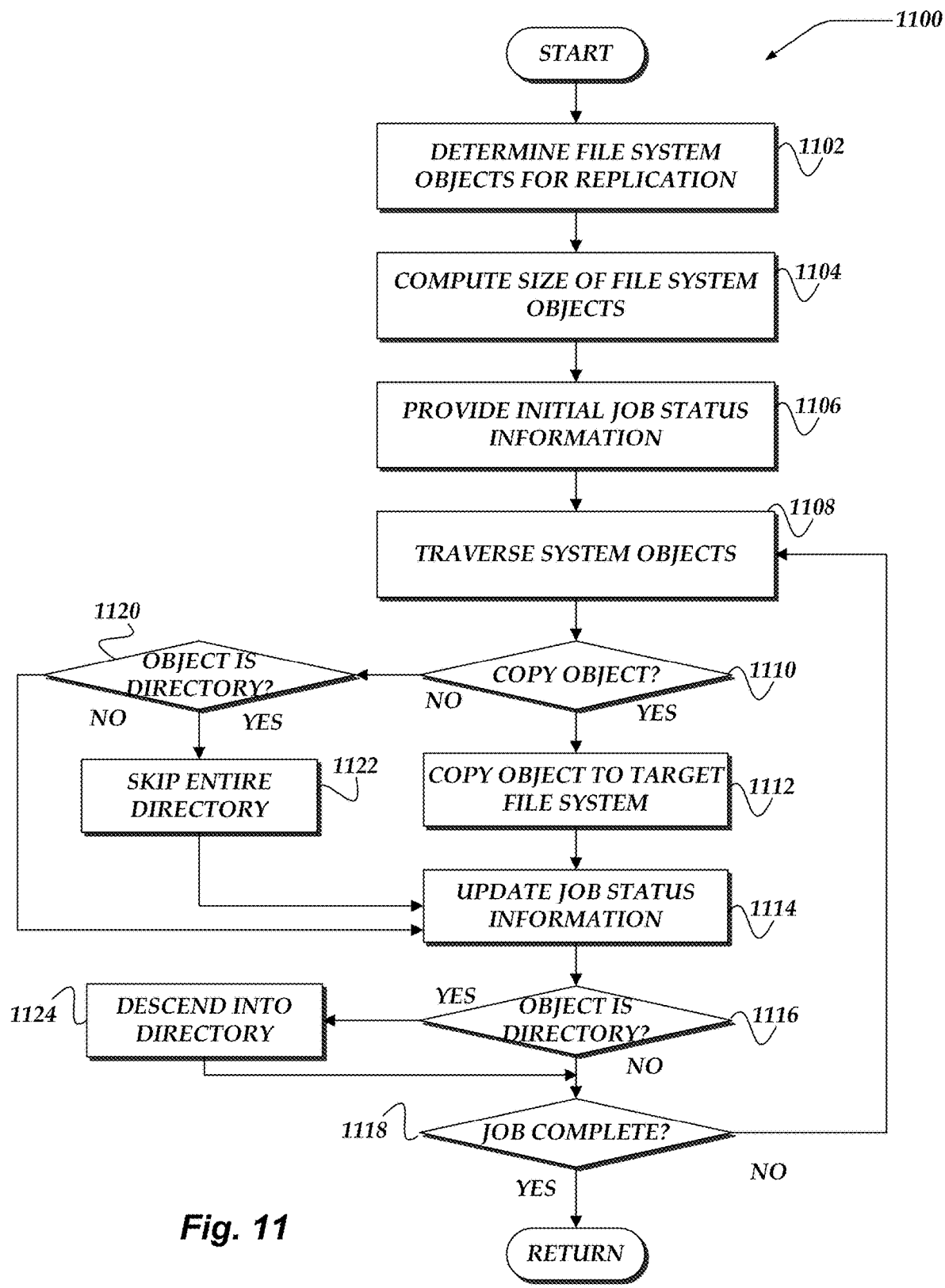
FIG. 11 illustrates a flowchart of a process for reporting the current completion of a long running replication job in accordance with one or more of the various embodiments.

FIG. 11 illustrates a flowchart of process 1100 for reporting the current completion of a long running replication job in accordance with one or more of the various embodiments. After a start block, at block 1102, in one or more of the various embodiments, a replication engine may be arranged to determine the file system objects that may be eligible to be included in a pending replication job. In one or more of the various embodiments, as described above, the replication engine may be arranged to determine the file system objects that are eligible for replication based on their association with a replication snapshot. Accordingly, in some embodiments, the replication engine may be enabled to rapidly determine the complete set of eligible file system objects without having to scan the entire file system.

At block 1104, in one or more of the various embodiments, the replication engine may be arranged to compute the size of each file system object and the size of the replication job. In one or more of the various embodiments, meta-data associated with the file system objects that are eligible for replication may include object size information, such as, actual size, block count, or the like. In some embodiments, the replication engine may be arranged to determine the number of fixed sized blocks that may be associated with the replication snapshot. Accordingly, in some embodiments, the amount of data associated with the replication may be computer based on the number of blocks and the defined fixed size of the blocks.

In one or more of the various embodiments, the replication engine may computer the size of the job based on the entire size of the portion of the file system starting with the root object of the replication job. For example, if the portion of the file system being replicated stores 1000 objects but only 100 objects need updating, the job size may initially be defined based on the 1000 objects. However, in this case, status job updates (see below) will account for the ineligible objects. For example, in some embodiments, as objects are visited during the replication job, the remaining job size may be decremented based on the size of the objects that are visited, whether they are copied or not.

In one or more of the various embodiments, the file system engine may be arranged to store information (e.g., meta-data) in parent objects that may improve the performance of computing the size of the replication job. In one or more of the various embodiments, each parent file system object may locally store an size value that represents the aggregate size of its child objects and itself. Accordingly, in one or more of the various embodiments, the total size associated with a directory may be computed without visiting each of its children objects.

At block 1106, in one or more of the various embodiments, the replication engine may be arranged to provide initial replication job status information. In one or more of the various embodiments, the information may be provided to a user-interface, graphical or otherwise, that may be arranged to report the current status of the pending replication job to one or more users. In one or more of the various embodiments, the replication engine may provide one or more APIs that enable clients, such as, one or more processes or applications to register to receive status information associated with pending replication job. In some embodiments, the one or more processes or applications may register callbacks, subscribe to message sources/queues, implement a polling protocol, or the like, or combination thereof. Accordingly, in one or more of the various embodiments, the replication engine may be arranged to generate a communication or notification message that includes one or more of status information, a replication job identifier, one or more metrics associated with the replication jobs, such as, total size, completion status, transfer rate, amount of data remaining to be transferred, amount of data transferred, or the like, or combination thereof. In some embodiments, clients may request some or all of the status information. Also, in some embodiments, clients may select from among available data formats, such as, JSON, XML, or the like.

At block 1108, in one or more of the various embodiments, the replication engine may be arranged to copy the one or more file system objects included in the replication job to the one or more target file systems. Accordingly, in some embodiments, the replication engine may begin a traversal of the file system objects to identify or select the file system objects for copying to from the source file system to the target file system.

At decision block 1110, in one or more of the various embodiments, if the file system object being visited during the traversal is eligible for copying, control may flow to block 1112; otherwise, control may flow to decision block 1120. As discussed above, the replication engine may determine if an object is eligible for copying based on the snapshot number that is associated with the object.

At block 1112, in one or more of the various embodiments, the replication engine may copy the file system object from the source file system to the target file system.

At block 1114, in one or more of the various embodiments, the replication engine may be arranged to update the replication job status information. Accordingly, in some embodiments, the updated status information may be provided to the clients, such as, one or more processes or applications that have registered for updates. Alternatively, in some embodiments, the clients may request the most current status information on demand rather than having the replication engine push the status information to the clients. In one or more of the various embodiments, the clients may provide the replication job identifier to enable the replication engine to provide the status information the for one or more replication jobs as requested by the clients.

In some embodiments, the job status information may include one or more values that indicate how much of the replication engine has been completed. Accordingly, in some embodiments, since the replication engine computed the total size of the job (at block 1104), as file objects are copied, the replication engine may track the total size of the objects that are copied to report remaining size of the job.

In some embodiments, if a directory object is skipped the status information may be updated based on the aggregate size that is made up of the objects in or below the directory object.

At decision block 1116, in one or more of the various embodiments, if the current object is a directory object (e.g., parent file system object), control may flow block 1124; other control may flow to decision block 1118.

At decision block 1118, in one or more of the various embodiments, if the replication job is complete, control may be returned to a calling process; otherwise, control may loop back to block 1108.

At decision block 1120, in one or more of the various embodiments, if the file system object being visited is a parent file system object, such as, a directory, control may flow to block 1122; otherwise, control may be flow to block 1114.

At block 1122, in one or more of the various embodiments, because the visited file system object is a parent object that is not included in the replication snapshot for the pending replication job, all of its children objects are also ineligible for copying to the target file system (because they have not been changed since the last replication job).

Accordingly, in some embodiments, the child objects may be omitted from the traversal of the file system. Next, control may flow to block 1114.

At block 1124, in one or more of the various embodiments, because the file system object being copied is parent object (e.g., a directory object), the traversal may descend into the parent object to continue the replication job. Next, control may flow to decision block 1118.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a file system engine to perform actions, including:
        providing a file system that includes a plurality of file objects, wherein the plurality of file objects includes one or more parent objects associated with one or more child objects;
        providing a root object of a portion of the file system;
        providing a replication snapshot that is associated with an epoch of the file system, wherein each child object that is modified during the epoch and each associated parent object is associated with the replication snapshot, wherein the portion of the file system is included in the replication snapshot; and
        generating another replication snapshot that is employed to extend the replication snapshot when a target file system is determined to be independently modified after the providing of the replication snapshot, wherein the other replication snapshot synchronizes the independent modification to the file system with the target file system; and
    instantiating a replication engine to perform actions, including:
        traversing the portion of file system starting from the root object, wherein the one or more parent objects that are unassociated with the replication snapshot are omitted from the traversal, and wherein the non-traversal of the one or more unassociated parent objects improves efficiency and performance of the network computer by reducing consumption of computing resources to perform the traversal;
        determining one or more replication objects based on the traversal, wherein each replication object is associated with one or more modifications made during the epoch; and
        executing a replication job that copies the one or more replication objects to a portion of the target file system, wherein a hierarchy of the portion of the file system is copied to the portion of the target file system, and wherein displayed status information for completion of the replication job is updated based on an aggregate size of each file object in or below each parent object that is a directory object and previously determined to be skipped for copying during execution of the replication job.

2. The method of claim 1, wherein the replication engine performs actions, including:
    determining an amount of data associated with the replication job based on a sum of a size of each replication object; and
    providing an indicator that is used to display one or more characteristics that are associated with a completion status of the replication job, wherein the one or more characteristics include one or more of a time remaining to complete the replication job, an amount of data provided to the target file system, or a percentage of completion of the replication job.

3. The method of claim 1, wherein the file system engine performs further actions, including, synchronizing the file system and the target file system until a current epoch of the target file system matches a previous epoch of the file system that comes immediately before the epoch of the file system that is associated with the replication snapshot.

4. The method of claim 1, wherein the replication engine performs further actions, including, determining one or more differences between the file system and the target file system based on the traversal, wherein each difference corresponds to a dissimilarity between the epoch associated with the one or more objects in the file system and a separate epoch associated with one or more other objects in the target file system.

5. The method of claim 1, wherein the replication engine performs further actions, including:
monitoring one or more triggering conditions that are associated with one or more of an application, a server, users, or a file system object; and
in response to one or more of triggering conditions occurring, initiating one or more other replication jobs.

6. The method of claim 1, wherein the replication engine performs further actions, including:
providing the status information that is associated with the replication job based on the amount of data associated with the replication job, wherein the status information includes one or more of a replication job identifier, total size, completion status, transfer rate, amount of data remaining to be transferred, or amount of data transferred; and
communicating the status information to one or more clients.

7. The method of claim 1, wherein the replication engine performs further actions, including:
discarding the one or more modifications during the epoch associated with the replication snapshot; and
disassociating the one or more replication objects from the replication snapshot and removing the replication snapshot from the file system.

8. The method of claim 1, wherein providing the replication snapshot, further comprises:
determining if the root object is modified during the epoch; and
providing the replication snapshot when the root object is modified during the epoch, wherein execution of the replication job is skipped for a cycle when the replication snapshot is unmodified during the epoch.

9. A system for managing data in a file system comprising:
a network computer, comprising:
a transceiver that communicates over the network;
a memory that stores at least instructions; and
one or more processors that execute instructions that perform actions, including:
instantiating a file system engine to perform actions, including:
providing a file system that includes a plurality of objects, wherein the plurality of objects includes one or more parent objects associated with one or more child objects;
providing a root object of a portion of the file system;
providing a replication snapshot that is associated with an epoch of the file system, wherein each child object that is modified during the epoch and each associated parent object is associated with the replication snapshot, wherein the portion of the file system is included in the replication snapshot; and
generating another replication snapshot that is employed to extend the replication snapshot when a target file system is determined to be independently modified after the providing of the replication snapshot, wherein the other replication snapshot synchronizes the independent modification to the file system with the target file system; and
instantiating a replication engine to perform actions, including:
traversing the portion of file system starting from the root object, wherein the one or more parent objects that are unassociated with the replication snapshot are omitted from the traversal, and wherein the non-traversal of the one or more unassociated parent objects improves efficiency and performance of the network computer by reducing consumption of computing resources to perform the traversal;
determining one or more replication objects based on the traversal, wherein each replication object is associated with one or more modifications made during the epoch; and
executing a replication job that copies the one or more replication objects to a portion of the target file system, wherein a hierarchy of the portion of the file system is copied to the portion of the target file system, and wherein status information for completion of the replication job is updated based on an aggregate size of each object in or below each parent object that is a directory object and also determined to be skipped for copying during execution of the replication job; and
another network computer, comprising:
a transceiver that communicates over the network;
a memory that stores at least instructions; and
one or more processors that execute instructions that perform actions, including:
providing the target file system.

10. The system of claim 9, wherein the replication engine performs actions, including:
determining an amount of data associated with the replication job based on a sum of a size of each replication object; and
providing an indicator that is used to display one or more characteristics that are associated with a completion status of the replication job, wherein the one or more characteristics include one or more of a time remaining to complete the replication job, an amount of data provided to the target file system, or a percentage of completion of the replication job.

11. The system of claim 9, wherein the file system engine performs further actions, including, synchronizing the file system and the target file system until a current epoch of the target file system matches a previous epoch of the file system that comes immediately before the epoch of the file system that is associated with the replication snapshot.

12. The system of claim 9, wherein the replication engine performs further actions, including, determining one or more differences between the file system and the target file system based on the traversal, wherein each difference corresponds to a dissimilarity between the epoch associated with the one or more objects in the file system and a separate epoch associated with one or more other objects in the target file system.

13. The system of claim 9, wherein the replication engine performs further actions, including:
monitoring one or more triggering conditions that are associated with one or more of an application, a server, users, or a file system object; and
in response to one or more of triggering conditions occurring, initiating one or more other replication jobs.

14. The system of claim 9, wherein the replication engine performs further actions, including:
providing the status information that is associated with the replication job based on the amount of data associated with the replication job, wherein the status information includes one or more of a replication job identifier, total size, completion status, transfer rate, amount of data remaining to be transferred, or amount of data transferred; and communicating the status information to one or more clients.

15. The system of claim 9, wherein the replication engine performs further actions, including:
   discarding the one or more modifications during the epoch associated with the replication snapshot; and
   disassociating the one or more replication objects from the replication snapshot and removing the replication snapshot from the file system.

16. The system of claim 9, wherein providing the replication snapshot, further comprises:
   determining if the root object is modified during the epoch; and
   providing the replication snapshot when the root object is modified during the epoch, wherein execution of the replication job is skipped for a cycle when the replication snapshot is unmodified during the epoch.

17. A processor readable non-transitory storage media that includes instructions for managing data in a file system over a network, wherein execution of the instructions by one or more processors on one or more network computers performs actions, comprising:
   instantiating a file system engine to perform actions, including:
      providing a file system that includes a plurality of objects, wherein the plurality of objects includes one or more parent objects associated with one or more child objects;
      providing a root object of a portion of the file system;
      providing a replication snapshot that is associated with an epoch of the file system, wherein each child object that is modified during the epoch and each associated parent object is associated with the replication snapshot, wherein the portion of the file system is included in the replication snapshot; and
      generating another replication snapshot that is employed to extend the replication snapshot when a target file system is determined to be independently modified after the providing of the replication snapshot, wherein the other replication snapshot synchronizes the independent modification to the file system with the target file system; and
   instantiating a replication engine to perform actions, including:
      traversing the portion of file system starting from the root object, wherein the one or more parent objects that are unassociated with the replication snapshot are omitted from the traversal, and wherein the non-traversal of the one or more unassociated parent objects improves efficiency and performance of the network computer by reducing consumption of computing resources to perform the traversal;
      determining one or more replication objects based on the traversal, wherein each replication object is associated with one or more modifications made during the epoch; and
      executing a replication job that copies the one or more replication objects to a portion of the target file system, wherein a hierarchy of the portion of the file system is copied to the portion of the target file system, and wherein status information for completion of the replication job is updated based on an aggregate size of each object in or below each parent object that is a directory object and also determined to be skipped for copying during execution of the replication job.

18. The media of claim 17, wherein the replication engine performs actions, including:
   determining an amount of data associated with the replication job based on a sum of a size of each replication object; and
   providing an indicator that is used to display one or more characteristics that are associated with a completion status of the replication job, wherein the one or more characteristics include one or more of a time remaining to complete the replication job, an amount of data provided to the target file system, or a percentage of completion of the replication job.

19. The media of claim 17, wherein the file system engine performs further actions, including, synchronizing the file system and the target file system until a current epoch of the target file system matches a previous epoch of the file system that comes immediately before the epoch of the file system that is associated with the replication snapshot.

20. The media of claim 17, wherein the replication engine performs further actions, including, determining one or more differences between the file system and the target file system based on the traversal, wherein each difference corresponds to a dissimilarity between the epoch associated with the one or more objects in the file system and a separate epoch associated with one or more other objects in the target file system.

21. The media of claim 17, wherein the replication engine performs further actions, including:
   monitoring one or more triggering conditions that are associated with one or more of an application, a server, users, or a file system object; and
   in response to one or more of triggering conditions occurring, initiating one or more other replication jobs.

22. The media of claim 17, wherein the replication engine performs further actions, including:
   providing the status information that is associated with the replication job based on the amount of data associated with the replication job, wherein the status information includes one or more of a replication job identifier, total size, completion status, transfer rate, amount of data remaining to be transferred, or amount of data transferred; and
   communicating the status information to one or more clients.

23. The media of claim 17, wherein the replication engine performs further actions, including:
   discarding the one or more modifications during the epoch associated with the replication snapshot; and
   disassociating the one or more replication objects from the replication snapshot and removing the replication snapshot from the file system.

24. A network computer for managing data in a file system, comprising:
   a transceiver that communicates over the network;
   a memory that stores at least instructions; and
   one or more processors that execute instructions that perform actions, including:
      instantiating a file system engine to perform actions, including:
         providing a file system that includes a plurality of objects, wherein the plurality of objects includes one or more parent objects associated with one or more child objects;
         providing a root object of a portion of the file system;
         providing a replication snapshot that is associated with an epoch of the file system, wherein each child object that is modified during the epoch and each associated parent object is associated with the replication snapshot, wherein the portion of the file system is included in the replication snapshot; and generating another replication snapshot that is employed to extend the replication snapshot when a target file system is determined to be independently modified after the providing of the replication snapshot, wherein the other replication snapshot synchronizes the independent modification to the file system with the target file system; and instantiating a replication engine to perform actions, including:

traversing the portion of file system starting from the root object, wherein the one or more parent objects that are unassociated with the replication snapshot are omitted from the traversal, and wherein the non-traversal of the one or more unassociated parent objects improves efficiency and performance of the network computer by reducing consumption of computing resources to perform the traversal;

determining one or more replication objects based on the traversal, wherein each replication object is associated with one or more modifications made during the epoch; and executing a replication job that copies the one or more replication objects to a portion of the target file system, wherein a hierarchy of the portion of the file system is copied to the portion of the target file system, and wherein status information for completion of the replication job is updated based on an aggregate size of each object in or below each parent object that is a directory object and also determined to be skipped for copying during execution of the replication job.

25. The network computer of claim 24, wherein the replication engine performs actions, including:

determining an amount of data associated with the replication job based on a sum of a size of each replication object; and providing an indicator that is used to display one or more characteristics that are associated with a completion status of the replication job, wherein the one or more characteristics include one or more of a time remaining to complete the replication job, an amount of data provided to the target file system, or a percentage of completion of the replication job.

26. The network computer of claim 24, wherein the file system engine performs further actions, including, synchronizing the file system and the target file system until a current epoch of the target file system matches a previous epoch of the file system that comes immediately before the epoch of the file system that is associated with the replication snapshot.

27. The network computer of claim 24, wherein the replication engine performs further actions, including, determining one or more differences between the file system and the target file system based on the traversal, wherein each difference corresponds to a dissimilarity between the epoch associated with the one or more objects in the file system and a separate epoch associated with one or more other objects in the target file system.

28. The network computer of claim 24, wherein the replication engine performs further actions, including:

monitoring one or more triggering conditions that are associated with one or more of an application, a server, users, or a file system object; and in response to one or more of triggering conditions occurring, initiating one or more other replication jobs.

29. The network computer of claim 24, wherein the replication engine performs further actions, including:

providing the status information that is associated with the replication job based on the amount of data associated with the replication job, wherein the status information includes one or more of a replication job identifier, total size, completion status, transfer rate, amount of data remaining to be transferred, or amount of data transferred; and communicating the status information to one or more clients.

30. The network computer of claim 24, wherein the replication engine performs further actions, including:

discarding the one or more modifications during the epoch associated with the replication snapshot; and disassociating the one or more replication objects from the replication snapshot and removing the replication snapshot from the file system.

* * * * *